United States Patent [19]

Fieldhouse

[11] Patent Number: 4,480,012

[45] Date of Patent: Oct. 30, 1984

[54] CONTACT ADHESIVE AND ADHESIVE SYSTEM FOR EPDM AND RELATED ELASTOMERS

[75] Inventor: John W. Fieldhouse, Mogadore, Ohio

[73] Assignee: The Firestone Tire & Rubber Company, Akron, Ohio

[21] Appl. No.: 588,848

[22] Filed: Mar. 12, 1984

Related U.S. Application Data

[62] Division of Ser. No. 431,403, Sep. 30, 1982, Pat. No. 4,450,252.

[51] Int. Cl.$^3$ .................. B32B 25/16; B32B 31/12
[52] U.S. Cl. .................................... 428/506; 156/71; 156/83; 156/94; 156/153; 428/521
[58] Field of Search .................. 156/153, 71, 83, 94; 428/506, 521

[56] References Cited

U.S. PATENT DOCUMENTS

| | | | |
|---|---|---|---|
| 1,489,477 | 4/1924 | Bowes | 156/153 |
| 2,697,472 | 12/1954 | Hawkinson | 156/153 |
| 4,257,837 | 3/1981 | Lucas | 156/153 |

*Primary Examiner*—C. Warren Ivy
*Attorney, Agent, or Firm*—Frank J. Troy, Sr.

[57] ABSTRACT

An adhesive composition for bonding cured layers of EPDM together is provided which comprises a neutralized sulfonated EPDM elastomeric terpolymer, an organic hydrocarbon solvent or mixture of an organic hydrocarbon solvent and an aliphatic alcohol, a para-alkylated phenol formaldehyde tackifying resin and an alkylphenol or ethoxylated alkylphenol. A method for bonding the cured layers of EPDM together utilizing the adhesive composition is also provided.

10 Claims, No Drawings

CONTACT ADHESIVE AND ADHESIVE SYSTEM FOR EPDM AND RELATED ELASTOMERS

This application is a division of application Ser. No. 431,403, filed Sept. 30, 1982, now U.S. Pat. No. 4,450,252.

BACKGROUND OF THE INVENTION

The present invention relates to a contact adhesive and adhesive system for EPDM and related elastomers. More particularly, the invention relates to an adhesive composition for bonding cured layers of EPDM together, a method for bonding said cured layers of EPDM together and a laminate formed by bonding the layers of EPDM together.

EPDM elastomers have long been of interest for possible use as a roofing material, particularly for the industrial and commercial flat roofing markets. Such elastomers provide significant advantages in flexibility and long term weathering resistance over convention BUR materials composed of tar paper composites which have poor flexibility and only very limited weathering resistance.

However, despite these important advantages, the use of EPDM elastomers in roofing applications has been hampered by certain disadvantages relating to the nature of the elastomer. A major disadvantage of such elastomers is the lack of adhesion of EPDM, especially cured EPDM, to itself. This is a serious problem since in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back with heat producing an open seam under severe conditions or a partially open seam (often referred to as a fish-mouth condition) under less severe conditions.

In view of the foregoing, it is necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both the short term and long term disbonding forces or stresses referred to above. Moreover, the adhesive must be resistant to oxidation, hydrolysis and chemical attack from ponded water. Additionally, the adhesive must provide the important property often referred to in the adhesive art as "Quick Stick". The term "Quick Stick" as used herein means the characteristics of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions including those of the present invention generally require anywhere from about two (2) to about seven (7) days at room temperature (i.e., 22° C.) to attain maximum adhesive strength. At higher ambient temperature, this time period may be somewhat less but at minimum will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two (2) to seven (7) days.

Commercial contact adhesives which are conventionally employed for bonding cured EPDM elastomer roofing sheets together generally consist of solutions of neoprene or neoprene-type polymers in aromatic or aromatic-aliphatic solvents containing 2-butanone often along with tackifying resins. However, such adhesives have not proven to be very satisfactory due to their lower than desirable peel adhesion strengths. Thus, the neoprene-type adhesives often provide peel adhesion values of only 1 to 2 lbs. per linear inch.

Pressure sensitive and contact adhesive compositions containing neutralized, partially neutralized or unneutralized sulfonated elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elasomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents while similar in composition to the adhesive compositions of the present invention suffer from a significant disadvantage which materially limits their usefulness as a contact adhesive for bonding cured EPDM elastomer roofing sheets together. As will be seen in the comparative evaluation below, compositions of the type disclosed in the above patents are deficient in Quick Stick properties.

A further disadvantage of the use of EPDM as a roofing material relates to the physical nature of the EPDM roofing material. Almost all of the EPDM sheeting material on the market has been treated with talc, clay or mica to assist processing during manufacture and to prevent sticking of the material in shipping and storage. This surface contaminant must be removed before the adhesive is applied. Accordingly, in addition to the need for an effective adhesive, there is a need for a simple and effective method for removing the contaminant and for bonding the cured surfaces of EPDM together.

SUMMARY OF THE INVENTION

In accordance with the present invention, an adhesive composition and method for bonding one cured layer of EPDM to another cured layer of EPDM are provided.

The adhesive composition comprises:

(a) a neutralized sulfonated EPDM elastomeric terpolymer having from about 10 to about 100 milliequivalents of neutralized sulfonate groups per 100 grams of terpolymer;

(b) from about 500 to about 1700 parts by weight per 100 parts by weight of said terpolymer of an organic hydrocarbon solvent or mixture of an organic hydrocarbon solvent and an aliphatic alcohol;

(c) from about 25 to about 100 parts by weight per 100 parts by weight of said terpolymer of a para-alkylated phenol formaldehyde type tackifying resin; and (d) from about 12.5 to about 75 parts by weight per 100 parts by weight of said terpolymer of an alkylphenol or ethoxylated alkylphenol.

The method for bonding one cured layer of EPDM to another cured layer of EPDM comprises the steps of:

(a) applying a coating of mineral oil to one surface of each cured layer of EPDM which is to be bonded together;

(b) abrading each of the mineral oil coated surfaces;

(c) removing residual mineral oil and surface impurities;

(d) applying a coating of adhesive composition to each of the abraded surfaces;

(e) allowing the coating of adhesive composition applied to each of said surfaces to dry for a sufficient time to permit evaporation of some of the components of the liquid vehicle of the composition;

(f) bringing the adhesive coated surfaces of each of said cured EPDM layers into contact with each other; and (g) applying pressure to the uncoated surface of at least one of the cured layers of EPDM.

DETAILED DESCRIPTION OF THE INVENTION

The term "EPDM" is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British Pat. No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon 2504 (Exxon Chemical Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an $\overline{M}_n$ as measured by GPC of about 47,000 and an $\overline{M}_w$ as measured by GPC of about 174,000. Another typical EPDM is Nordel 1070 an ethylene/propylene/1,4-hexadiene terpolymer having an $\overline{M}_n$ of 87,000 and an $\overline{M}_w$ of 188,000 available from duPont.

As indicated, the polymer component of the adhesive composition of the invention is a neutralized sulfonated EPDM elastomeric terpolymer having from about 10 to about 100, preferably from about 10 to about 30 milliequivalents (hereinafter meq) of neutralized sulfonate groups per 100 grams of terolymer. It should be noted at this time that the term "neutralized" as used in the foregoing context is intended to encompass either complete neutralization of the sulfonate groups or partial neutralization of the sulfonate groups.

The neutralized sulfonated EPDM elastomeric terpolymer can be prepared by methods known in the art. Thus, for example, the neutralized sulfonated EPDM elastomeric terpolymer may be prepared by first sulfonating an EPDM elastomer using a complex of a sulfur trioxide donor and a Lewis Base and then neutralizing the sulfonated EPDM with a basic material selected from an organic amine and a mono-, di-, tri or tetravalent metal ion of a metal of Groups I, II, III, IV, V, VI-B, VII-B and VIII of the Periodic Table of The Elements as described in U.S. Pat. No. 3,642,728, the disclosure of which is incorporated herein by reference.

The EPDM elastomer can also be sulfonated using a sulfonating agent selected from acetyl sulfate, propionyl sulfate and butyryl sulfate as described in U.S. Pat. No. 3,836,511, the disclosure of which is incorporated herein by reference.

The preferred neutralized sulfonated EPDM elastomeric terpolymers for use in the adhesive compositions of the invention are zinc neutralized sulfonated EPDM elastomeric terpolymers such as those described in U.S. Pat. Nos. 4,137,203 and 4,222,914, the disclosures of which are incorporated herein by reference. A particularly preferred zinc neutralized sulfonated EPDM elastomeric terpolymer for use in the adhesive compositions herein is a zinc sulfonated EPDM having a base EPDM molecular weight of 50,000, an average number of $SO_3$-groups/molecule of 13, 2.7% by weight ionic groups, a bulk density of 8–10 lbs./cu. ft., a Tg of −60° C. and 25 meq of zinc sulfonate groups per 100 grams of terpolymer available under the designation IE 2590 from Uniroyal.

As indicated, the adhesive composition includes an organic hydrocarbon solvent or mixture of an organic hydrocarbon solvent and an aliphatic alcohol. Virtually any of the organic hydrocarbon solvents heretofore utilized as solvents for EPDM may be utilized. Suitable organic hydrocarbon solvents which may be utilized include aromatic and aliphatic hydrocarbons such as benzene, toluene, xylene, cyclohexane, pentane, isopentane, hexane, isohexane, heptane, and the like. The preferred organic hydrocarbon solvents are toluene and xylene.

A mixture of an organic hydrocarbon solvent of the above type and an aliphatic alcohol may also be utilized to advantage in some instances. Thus, when it is desired to produce an adhesive composition of moderate or reduced viscosity, the use of such a mixture is often of advantage. The aliphatic alcohol in the mixture aids in solubilizing the ionic groups of the neutralized sulfonated EPDM elastomeric terpolymer. As is well known, during the neutralization of the sulfonated EPDM terpolymer with a cation such as a metal, alkali metal or ammonium cation, ionic groups are formed. Such neutralized polymers are commonly referred to in the art as ionic polymers or ionomers which by virtue of ionic association are said to contain ionic crosslinks. The aliphatic alcohol aids in solubilizing these ionic crosslinks most probably by causing dissociation of the ions. However, upon removal of the organic hydrocarbon solvent and the aliphatic alcohol, as for example by evaporation during drying of the adhesive composition, the ionic groups reassociate thereby regenerating the ionic crosslinks. Aliphatic alcohols which may be employed in the mixture include linear and branched chain alcohols such as methanol, ethanol, propanol, isopropanol, butanol, t-amyl alcohol, 4-methyl-2-pentanol and the like. The preferred aliphatic alcohols are methanol and t-amyl alcohol.

The amount of aliphatic alcohol employed in the mixture may be conveniently based on the ratio of organic hydrocarbon to aliphatic alcohol utilized in the mixture. In general, the ratio of organic hydrocarbon to aliphatic alcohol in the mixture may range from 10:1 to 33:1.

The amount of organic hydrocarbon solvent or mixture of organic hydrocarbon solvent and aliphatic alcohol employed in the adhesive composition will depend upon factors such as the molecular weight of the polymer component, desired composition viscosity and the like. In general, the adhesive composition may contain from about 500 to about 1700 parts of the organic hydrocarbon solvent or mixture per 100 parts by weight of the polymer component.

The adhesive composition of the invention also includes a para-alkylated phenol formaldehyde type tackifying resin. Suitable para-alkylated phenol formaldehyde type tackifying resins which may be employed include para-alkylated phenol formaldehydes such as para-octylphenol formaldehyde, para-nonylphenol formaldehyde, para-dodecylphenol formaldehyde and the like. Additionally, para-alkylated phenol formaldehyde resins modified by reaction with N-methylolmorpholine may also be suitable. Such modified para-alkylated phenol formaldehyde resins and their method of preparation are described in U.S. Pat. No. 4,146,513, the disclosure of which is incorporated by reference. A preferred para-alkylated phenol formaldehyde type tackifying resin for use in the composition is a modified octylphenol formaldehyde having a ring and ball softening point of 110° C., a specific gravity of 1.023 and an acid number of 48 available from Sherwin-Williams Company under the designation Dyphane 8340.

The amount of tackifying resin included in the composition may range from about 25 to about 100 parts by weight per 100 parts by weight of polymer component.

The adhesive composition also includes or contains an alkylphenol or ethoxylated alkylphenol. The precise mechanism by which these materials function in the adhesive composition is not known with certitude. However, these materials appear to serve as wetting agents for the EPDM substrates which are to be bonded together thereby permitting greater penetration of adhesive into the substrate. Additionally and most importantly, these materials impart or aid in imparting Quick Stick properties to the adhesive composition. Suitable alkylphenols which may be utilized include p-alkylphenols such as p-octylphenol, p-nonylphenol, p-dodecylphenol and the like. Suitable ethoxylated alkylphenols which may be utilized include the nonylphenoxy poly(ethyleneoxy)ethanol types. The preferred material for use in the adhesive composition is an alkylphenol and of the alkylphenols, p-dodecylphenol is particularly preferred.

The amount of alkylphenol or ethoxylated alkylphenol included in the composition may range from about 12.5 to about 75 parts by weight per 100 parts by weight of the adhesive polymer component.

The adhesive compositions of the invention may have varying solids contents and viscosities depending upon factors such as the desired method of application, desired drying times and the like. In general, the adhesive compositions may have solids contents of from about 10 to about 20 percent by weight and Brookfield viscosities (#2 spindle, 12 RPM) as measured at room temperature of from about 50 to about 5000 centipoises.

The adhesive compositions can be prepared by any conventional procedure using conventional mixing techniques and equipment. Thus, the adhesive composition components can be simply charged to a suitable mixing vessel equipped with stirring means and mixed together with or without added heating to facilitate dissolution.

The first step (i.e., step (a)) in the method of bonding one cured layer of EPDM to another cured layer of EPDM involves the application of a coating of mineral oil to one surface of each cured layer of EPDM which is to be bonded together. As will be evident, the strongest bond between the EPDM roofing sheets is achieved by lap splicing the two EPDM sheets. Accordingly, the coating of mineral oil should be applied to the upper surface of one EPDM sheet and the lower surface of the other EPDM sheet. The coating of mineral oil can be applied by any convenient method. Thus, the coating can be applied by wiping with a suitable cloth or pad or by brushing as with a paint brush.

The second step, step (b), involves abrading each of the mineral oil coated surfaces to remove surface impurities and contaminants such as talc, mica, clay etc. The abrasion step can be conducted using a fine pad such as steel wool emery cloth and the like or, preferably, an orbital sander containing emery cloth.

The third step, step (c), in the method involves removing residual mineral oil and impurities from the abraded surfaces. This can be accomplished by any convenient procedure such as for example using an absorbent material such as sponge or cloth.

The fourth step, step (d), in the method involves the application of a coating of the above described adhesive composition to each of the abraded surfaces. Any convenient application procedure can be utlized including wiping with a cloth, painting with a paint brush or roller or spraying using an airless spray gun.

The fifth step, step (e), of the method involves allowing the coating of adhesive composition to dry for a sufficient period of time to permit evaporation of some of the volatile components of the liquid vehicle of the adhesive composition. Thus, the coating after a period of drying should remain somewhat tacky to the touch. Specific drying times are dependent upon factors such as temperature, humidity and the like. In general, drying times may range from 5 to 60 minutes.

The sixth step, step (f), of the method involves bringing the adhesively coated surfaces of the cured EPDM layers or sheets to be bonded together into contact with each other. This is accomplished manually. As will be evident, when a lap splice is to be utilized, the coated lower surface of one EPDM sheet will be brought into contact with the coated upper surface of the second EPDM sheet.

The seventh and final step, step (g), of the method involves applying pressure to the uncoated surface of at least one of the cured layers of EPDM. In the case of a lap splice, the pressure will be applied to the uncoated upper surface of the cured EPDM layer. The pressure may be applied manually but preferably is applied by means of a roller such as a standard rubber roller or paint type roller.

As will be appreciated, in lap splicing two sheets of cured EPDM, a laminate is formed. The laminate comprises a first layer of cured EPDM having an upper and lower surface; a second layer of a cured or ionically crosslinked adhesive of the above-described type, said second layer being in contact with the lower surface of said first layer and a third layer of a cured EPDM, said third layer having an upper and lower surface with said upper surface being in contact with the second layer of cured adhesive.

The following examples are submitted for the purpose of further illustrating the nature of the present invention and are not to be considered as a limitation on the scope thereof. Parts and percentages shown in the examples are by weight, unless otherwise indicated.

EXAMPLES 1-4

In these examples, talc treated 3"×6"×0.060" thick sheets of compounded and cured Nordel 1070 EPDM were spliced together (lap splice) using adhesive compositions and the bonding method of the invention. EPDM compound formulation and curing conditions are shown in Examples 13-16.

The procedure for bonding the talc treated EPDM sheets together was as follows:

First, mineral oil was applied to the surface of each EPDM sheet to be bonded together using a wash bottle containing mineral oil. Then, the mineral oil coated surfaces were abraded using an air driven orbital sander equipped with emery cloth. Next, excess mineral oil and loose talc were removed by wiping the surfaces with a cheese cloth. Then, a coating of adhesive composition was applied over a 3"×4" area of the surface of each EPDM sheet to be bonded using a 1" wide paint brush. The adhesive coated surfaces were then allowed to dry for a period of time prior to splicing the sheets together (i.e., open drying times). In this evaluation, the open drying times of the adhesive formulations were varied to determine the effect of open drying time on adhesion (see Table I). Following this step, the adhesive coated surfaces of the EPDM sheets were brought into contact with each other and manually pressed together to bond the sheets together. Then, pressure was applied to each manually bonded sample in order to further press the surfaces together using a 2"×2" diameter steel roller. The bonded samples were then allowed to age for about 2 days at room temperature (i.e., 22° C.) in order to permit further drying of the adhesive composition and further developement of peel adhesion strength. Additionally, certain of the bonded samples were heat aged for an additional 7 days at 70° C. to determine the effect of heat aging on peel adhesion strength.

The bonded test samples were then evaluated for peel adhesion strength. Peel adhesion of each test strip was conducted on an Instron tester operating at 2" per minute using the T peel adhesion test set forth in ASTM D-413. The peel adhesion strengths of the test strips were determined at room temperature (i.e., 22° C.).

Adhesion composition formulations, adhesive open drying times and peel adhesion results are shown in Table I.

TABLE I

| Example No. | 1 | 2 | 3 | 4 |
|---|---|---|---|---|
| Ingredients (parts by weight) | | | | |
| IE 2590* | 100.0 | 100.0 | 100.0 | 100.0 |
| toluene | 1700.0 | 1700.0 | 1700.0 | 1700.0 |
| methanol | 100.0 | 100.0 | 100.0 | 100.0 |
| Dyphane 8340** | 100.0 | 50.0 | 50.0 | 50.0 |
| p-nonylphenol | 50.0 | 50.0 | 50.0 | 50.0 |
| open drying time (min.) | 3 | 3 | 5 | 10 |
| Peel Adhesion at R.T., PLI*** | | | | |
| aged 2 days at 22° C. | 11.5 | 11.0 | 12.0 | 8.0 |
| aged 7 days at 70° C. | 14.0 | 12.5 | 13.5 | 12.0 |

*zinc sulfonated EPDM available from Uniroyal described above
**modified octylphenol formaldehyde tackifying resin available from Sherwin-Williams Company described above
***PLI means pounds per linear inch In contrast to the excellent peel adhesion strengths shown above, EPDM sheets bonded with SA1017, a commercial neoprene type adhesive available from Uniroyal, show peel adhesion strengths of 1.1 PLI (aged 2 days at 22° C.) and 1.1 PLI (heat aged 7 days at 70° C.) when the surface of the EPDM sheets are treated with mineral oil and 4.0 PLI (aged 2 days at 22° C.) and 3.0 PLI (heat aged) when the surface of the EPDM sheets are treated with toluene.

EXAMPLES 5-7

These examples illustrate the bonding of 3"×6"×0.060" thick sheets of compounded and cured EPDM (see Examples 13-16 for compound formulation and curing conditions) using adhesive compositions containing an organic hydrocarbon as the sole solvent. The procedure for bonding the sheets together was substantially similar to that of Examples 1-4. Peel adhesion was determined substantially in accordance with the procedure of Examples 1-4 except that some of the test strips were aged for 7 days at 22° C. and some were heat aged for 7 days at 70° C. Adhesve formulations and peel adhesion results are shown in Table II.

TABLE II

| Example No. | 5 | 6 | 7 |
|---|---|---|---|
| Adhesive Formulation | | | |
| IE 2590 | 100.0 | 100.0 | 100.0 |
| toluene | 850.0 | 1700.0 | 1700.0 |
| Dyphane 8340 | 50.0 | 75.0 | 75.0 |
| p-dodecylphenol | 50.0 | 75.0 | 75.0 |
| Peel Adhesion at R.T., PLI | | | |
| aged 7 days at 22° C. | N.D.* | 9.0 | 6.0 |
| aged 7 days at 70° C. | 17.0 | 19.0 | 15.0 |

*not determined

EXAMPLES 8-12

These examples illustrate the bonding of 3"33 6"×0.060" thick compounded and cured EPDM sheets (compound formulation and curing conditions as in Examples 13-16) using varying adhesive composition formulations and varying surface preparation techniques. The method for bonding the EPDM sheets together was substantially the same as that set forth in Examples 1-4 with the exception that the mineral oil treated surfaces were abraded using different materials. Peel adhesion was determined substantially in accordance with the procedure of Examples 5-7. Adhesive formulations, surface preparation variations and peel gether and peel adhesion results are shown in Table IV.

TABLE IV

| Example No. | 13 | 14 | 15 | 16 |
|---|---|---|---|---|
| Adhesive Formulation | | | | |
| IE 2590 | 100.0 | 100.0 | 100.0 | 100.0 |
| toluene | 1700.0 | 1700.0 | 1700.0 | 1700.0 |
| methanol | 100.0 | 100.0 | 100.0 | 100.0 |
| Dyphane 8340 | 75.0 | 75.0 | 75.0 | 75.0 |
| p-dodecylphenol | 75.0 | 75.0 | 75.0 | 75.0 |
| EPDM sheets | | | | |
| type EPDM* | Nordel 1070 | Vistalon 4608 | EPSYN40A | EPSYN70A |
| Peel Adhesion at R.T., PLI | | | | |
| aged 7 days at 22° C. | 7.5 | 6.5 | 8.2 | 5.0 |
| aged 7 days at 70° C. | 21.0 | 24.0 | 23.0 | 22.0 |

*Nordel 1070 is an ethylene/propylene/1,4-hexadiene terpolymer having an $\bar{M}_n$ of 87,000 and an $\bar{M}_w$ of 188,000 available from duPont.
Vistalon 4608 is an ethylene/propylene/ethylidene norbornene terpolymer having a Mooney viscosity (ML, 1 + 4 @ 127° C.) of 62 available from Exxon.
EPSYN40A is an ethylene/propylene/ethylidene norbornene terpolymer having a Mooney viscosity (ML, 1 + 4 @ 125° C.) of 40 available from Copolymer Corporation.
EPSYN70A is an ethylene/propylene/ethylidene norbornene terpolymer having a Mooney viscosity (ML, 1 + 4 @ 125° C.) of 70 available from Copolymer Corporation.

adhesion results are shown in Table III.

TABLE III

| Example No. | 8 | 9 | 10 | 11 | 12 |
|---|---|---|---|---|---|
| Adhesive Formulation | | | | | |
| IE 2590 | 100.0 | 100.0 | 100.0 | 100.0 | 100.0 |
| toluene | 1700.0 | 1700.0 | 1700.0 | 1700.0 | 850.0 |
| methanol | 50.0 | 100.0 | 50.0 | 100.0 | — |
| t-amyl alcohol | — | — | — | — | 50.0 |
| Dyphane 8340 | 50.0 | 50.0 | 50.0 | 100.0 | 50.0 |
| p-nonylphenol | 50.0 | 50.0 | — | 50.0 | — |
| p-dodecylphenol | — | — | 50.0 | — | 50.0 |
| EPDM Surface Preparation | | | | | |
| Coating | mineral oil | mineral oil | mineral oil | mineral oil | mineral oil |
| Abrasion method | orbital sander with emery cloth | cheese cloth- manual | orbital cheese sander with emery cloth | orbital cloth- manual | orbital sander with emery cloth |
| Peel Adhesion at R.T., PLI | | | | | |
| aged 7 days at 22° C. | 11.0 | 9.5 | 10.0 | 5.0 | — |
| aged 7 days at 70° C. | 11.5 | 15.5 | 13.0 | 20.0 | 18.0 |

EXAMPLES 13-16

These examples illustrate the use of the adhesive compositions and method of the invention in bonding together different types of compounded and cured EPDM terpolymers. Sheets of different EPDM terpolymers were prepared by compounding various commercially available EPDM terpolymers, sheeting the compounded stocks into 3"×6"×0.060" thick sheets and then curing the sheets for 30 minutes at 320° F. in a curing press. The compounds were prepared using standard rubber mixing techniques and equipment by mixing together the following ingredients: 100.0 parts EPDM, 133.0 parts carbon black, 70.0 parts oil, 5.0 parts zinc oxide, 1.0 part stearic acid and 5.8 parts curing agents. The cured EPDM sheets were then bonded together and tested for peel adhesion in accordance with the procedures set forth in Examples 5-7. The adhesive formulation, type EPDM sheets bonded to-

EXAMPLES 17-19

These examples illustrate the use of higher solids, higher viscosity adhesive compositions of the invention in the bonding of 3"×6"×0.060" thick compounded and cured EPDM sheets. The method for bonding the EPDM sheets together was substantially the same as that set forth in Examples 1-4. Peel adhesion was determined sustantially in accordance with the procedure of Examples 5-7. Adhesive formulations and peel adhesion results are shown in Table V.

TABLE V

| Example No. | 17 | 18 | 19 |
|---|---|---|---|
| Adhesive Formulation | | | |
| IE 2590 | 100.0 | 100.0 | 100.0 |
| toluene | 1700.0 | 850.0 | — |
| xylene | — | — | 850.0 |
| methanol | 100.0 | 50.0 | 50.0 |
| Dyphane 8340 | 50.0 | 50.0 | 50.0 |
| p-dodecylphenol | 50.0 | 50.0 | 50.0 |
| solids, % | 10.5 | 18.2 | 18.2 |
| Brookfield viscosity (CPS) (#2 spindle, 12 RPM) | 65 | 1200 | 1238 |
| Peel Adhesion at R.T., PLI | | | |
| aged 7 days @ 22° C. | 3.5 | 5.5 | 8.0 |
| aged 7 days @ 70° C. | 17.0 | 15.0 | 17.0 |

EXAMPLES 20-21 and A - B

Comparative Evaluation of Quick Stick Properties

In this evaluation, adhesive compositions of the invention which contain an alkylphenol component were compared to adhesive compositions of the prior art type (see U.S. Pat. No. 3,801,531) which do not contain such a component for Quick Stick properties.

In order to conduct a more stringent comparison, the adhesive compositions of the invention were compared to adhesive compositions of the prior art type having essentially the same compositions except for deletion of the alkylphenol component. In addition, basically the same procedure was employed to mix the adhesive compositions, to remove the talc from the talc treated surfaces of the cured EPDM sheets to be bonded together, to apply the adhesive coatings to the EPDM sheets and to splice the EPDM sheets together in order to minimize or eliminate any effect on Quick Stick properties which might be caused by variations in such procedures.

The general procedure utilized to prepare the test strips or samples for evaluation of Quick Stick properties of both the adhesive compositions of the invention and the adhesive compositions of the prior art type was as follows:

A compounded and cured EPDM sheet, 3.0"×6.0"×0.060" thick, was treated with mineral oil and then mechanically scrubbed with a nylon brush. The surface was wiped free of excess oil and contaminants with cheese cloth. A second talc treated compounded and cured EPDM sheet, 2.5"×6.0"×0.060" thick, was treated in the same manner. To each treated surface was then applied 2.0 ml of the adhesive composition to be tested. The adhesive coated surfaces were then permitted to open dry for a period of time to permit evaporation of a substantial portion of the solvent from the adhesive composition. In this evaluation, adhesive compositions containing toluene as the solvent were permitted to open dry for 20 minutes prior to splicing the sheets together while adhesive compositions containing xylene were permitted to open dry for 40 minutes prior to splicing the sheets together. Following the open drying period, the adhesive coated surfaces of each EPDM sheet were brought into contact with each other and pressure was applied to the upper surface of the uncoated sheet using a roller as in Examples 1–19.

It should be noted at this time that test strips prepared with the adhesive compositions of the invention immediately stuck together showing no evidence of partial separation (i.e., fishmouthing). In contrast, test strips prepared with adhesive compositions of the prior art (no alkylphenol) began to curl and separate at the splice evidencing a fishmouth appearance. In this latter case, it was necessary to restitch the splice several times before the spliced sheets stuck together.

The original strength of the lap splice and development of lap strength over time was then evaluated using the peel adhesion procedure set forth in ASTM D-413. The peel adhesion strengths of the test strips were tested periodically using the original starting time as the time the adhesive coated EPDM sheets were brought into contact with each other.

Adhesive formulations, open drying times for the formulations and peel adhesion results at various time periods after making the slice are shown in Table VI. For convenience, adhesive compositions of the invention have been designated Examples 20-21 and adhesive compositions of the prior art have been designated as Examples A-B.

TABLE VI

| Example No. | 20 | A | 21 | B |
|---|---|---|---|---|
| Adhesive Formulation | | | | |
| IE 2590 | 100.0 | 100.0 | 100.0 | 100.0 |
| toluene | — | — | 850.0 | 850.0 |
| xylene | 850.0 | 850.0 | — | — |
| methanol | 50.0 | 50.0 | 50.0 | 50.0 |
| Dyphane 8340 | 50.0 | 50.0 | 50.0 | 50.0 |
| p-dodecylphenol | 50.0 | — | 50.0 | — |
| open drying time (min.) | 40 | 40 | 20 | 20 |
| PLI (22° C.) | | | | |
| after 15 min. | 0.8 | 0 | 0.2 | 0.1 |

TABLE VI-continued

| Example No. | 20 | A | 21 | B |
|---|---|---|---|---|
| after 30 min. | 2.4 | 0.1 | 0.5 | 0.15 |
| after 60 min. | 2.3 | 0.1 | 0.6 | 0 |
| after 120 min. | 3.8 | 0.5 | 1.1 | 0.5 |
| after 240 min. | 3.4 | 0 | 1.6 | 0 |
| after 1440 min. | 2.7 | 0.1 | 4.6 | 0.1 |

It should again be emphasized that this evaluation measures the Quick Stick properties of the adhesive composition. In this evaluation, the peel adhesion strengths were determined within a relatively short period of time after the adhesive coated EPDM sheets were brought into contact with each other (e.g., 15 minutes, 30 minutes, 60 minutes, 120 minutes, etc.). In contrast, the peel adhesion strengths shown in the earlier examples (i.e., 1–19) were determined on test strips which had been aged for 2 days at 22° C., 7 days at 22° C. and 7 days at 70° C. after the adhesive coated EPDM sheets had been brought into contact with each other.

As can be seen from the above peel adhesion data, adhesive compositions of the invention (Examples 20 and 21) show peel strengths which are of much greater magnitude than the peel strengths of adhesive compositions of the prior art type (Examples A and B).

EXAMPLES 22–23

These examples further illustrate the Quick Stick properties of the adhesive composition of the invention. The evaluation was conducted utilizing substantially the same procedure set forth in Examples 20 and 21. Adhesion composition formulations and peel adhesion results after various periods of time following the splicing of the adhesive coated EPDM sheets together are shown in Table VII.

TABLE VII

| Example No. | 22 | 23 |
|---|---|---|
| Adhesive Formulation | | |
| IE 2590 | 100.0 | 100.0 |
| toluene | 850.0 | — |
| xylene | — | 850.0 |
| Dyphane 8340 | 50.0 | 50.0 |
| p-dodecylphenol | 50.0 | 50.0 |
| Brookfield viscosity (#2 spindle, 12 RPM) | 2550 | 4875 |
| open drying time (min.) | 20 | 40 |
| PLI (22° C.) | | |
| after 15 min. | 1.3 | 1.3 |
| after 30 min. | 1.3 | 2.3 |
| after 60 min. | 1.3 | 2.7 |
| after 120 min. | 2.7 | 2.8 |
| after 240 min. | 2.7 | 2.4 |
| after 1440 min. | — | 3.8 |

I claim:

1. A method for bonding one cured layer of EPDM to another cured layer of EPDM comprising the steps of:
   (a) applying a coating of mineral oil to one surface of each cured layer of EPDM which is to be bonded together;
   (b) abrading each of the mineral oil coated surfaces;
   (c) removing residual mineral oil and surface impurities;
   (d) applying a coating of an adhesive composition over each of abraded surfaces, said adhesive composition comprising:
      (i) a neutralized sulfonated EPDM elastomeric terpolymer having from about 10 to about 100 milliequivalents of neutralized sulfonate groups per 100 grams of terpolymer;

(ii) from about 500 to about 1700 parts by weight per 100 parts by weight of said terpolymer of an organic hydrocarbon solvent or mixture of an organic hydrocarbon solvent and an aliphatic alcohol;

(iii) from about 25 to about 100 parts by weight per 100 parts by weight of said terpolymer of a para-alkylated phenol formaldehyde or an N-methylol morpholine-modified para-alkylated phenol formaldehyde tackifying resin; and (iv) from about 12.5 to about 75 parts by weight per 100 parts by weight of said terpolymer of an alkylphenol or ethoxylated alkylphenol;

(e) allowing the adhesive composition applied to each of said surfaces to dry for a sufficient time to permit evaporation of some of the components of the liquid vehicle of said composition;

(f) bringing the adhesive coated surfaces of each of said cured EPDM layers into contact with each other; and (g) applying pressure to the uncoated surface of at least one of the cured layers of EPDM.

2. The method of claim 1 wherein in step (b) the mineral oil coated surfaces are abraded by sanding with an orbital sander equipped with emery cloth.

3. The method of claim 1 wherein in step (e) the adhesive composition is allowed to dry for a period of from 5 to 60 minutes.

4. The method of claim 1 wherein the neutralized sulfonated EPDM elastomeric terpolymer of the adhesive composition is a zinc neutralized sulfonated EPDM elastomeric terpolymer.

5. The method of claim 1 wherein said organic hydrocarbon solvent is toluene or xylene.

6. The method of claim 1 wherein said aliphatic alcohol is methanol or t-amyl alcohol.

7. The method of claim 1 wherein the ratio of organic liquid hydrocarbon to aliphatic alcohol in said mixture is from 10:1 to 33:1.

8. The method of claim 1 wherein the N-methylol morpholine modified para-alkylated phenol formaldehyde tackifying resin of the adhesive composition is an N-methylol morpholine modified octylphenol formaldehyde.

9. The method of claim 1 wherein the alkylphenol of the adhesive composition is p-nonylphenol or p-dodecylphenol.

10. A laminate comprising:

(a) a first layer of a cured EPDM, said first layer having an upper and lower surface;

(b) a second layer of a cured adhesive composition, said second layer being in contact with the lower surface of said first layer and wherein said adhesive composition prior to curing comprises:

(i) a neutralized sulfonated EPDM elastomeric terpolymer having from about 10 to about 100 milliequivalents of neutralized sulfonate groups per 100 grams of terpolymer;

(ii) from about 500 to about 1700 parts by weight per 100 parts by weight of said terpolymer of an organic hydrocarbon solvent or mixture of an organic hydrocarbon solvent and an aliphatic alcohol;

(iii) from about 25 to about 100 parts by weight per 100 parts by weight of said terpolymer of a para-alkylated phenol formaldehyde or N-methylol morpholine-modified para-alkylated phenol formaldehyde tackifying resin; and (iv) from about 12.5 to about 75 parts by weight per 100 parts by weight of said terpolymer of an alkylphenol or ethoxylated alkylphenol; and (c) a third layer of a cured EPDM, said third layer having an upper and lower surface with said upper surface being in contact with said second layer of cured adhesive composition.

* * * * *